US008443344B1

(12) United States Patent
Sundararajan et al.

(10) Patent No.: US 8,443,344 B1
(45) Date of Patent: May 14, 2013

(54) METHODS FOR IDENTIFYING GATING OPPORTUNITIES FROM A HIGH-LEVEL LANGUAGE PROGRAM AND GENERATING A HARDWARE DEFINITION

(75) Inventors: Prasanna Sundararajan, San Jose, CA (US); Tim Tuan, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 1266 days.

(21) Appl. No.: 12/237,486

(22) Filed: Sep. 25, 2008

(51) Int. Cl.
*G06F 9/44* (2006.01)

(52) U.S. Cl.
USPC ........... 717/137; 717/136; 717/140; 717/160; 716/100; 716/103; 716/118; 716/126; 716/133

(58) Field of Classification Search ............. 717/137
See application file for complete search history.

(56) References Cited

U.S. PATENT DOCUMENTS

| 7,098,689 | B1 | 8/2006 | Tuan et al. | |
| 7,315,991 | B1 * | 1/2008 | Bennett | 716/103 |
| 2005/0028135 | A1 * | 2/2005 | Burnette et al. | 717/106 |
| 2005/0188270 | A1 * | 8/2005 | Dollin et al. | 714/38 |
| 2006/0150135 | A1 * | 7/2006 | Hamada et al. | 716/12 |
| 2006/0277018 | A1 * | 12/2006 | Bolcato et al. | 703/14 |
| 2007/0157044 | A1 * | 7/2007 | You et al. | 713/320 |

* cited by examiner

*Primary Examiner* — Li B Zhen
*Assistant Examiner* — Lenin Paulino
(74) *Attorney, Agent, or Firm* — LeRoy D. Maunu; Lois D. Cartier

(57) ABSTRACT

Approaches for generating a hardware definition from a program specified in a high-level language. In one approach, a first set of blocks of instructions in the high-level language program is identified. Each block in the first set is bounded by a respective loop designation in the high-level language. For each block in the first set, an associated respective second set of one or more blocks of the program is identified. Each block in the second set is outside the block in the first set. A hardware definition of the program is generated and stored. For each block in the first set, the hardware definition specifies power-reducing circuitry for one or more blocks in the associated second set. The power-reducing circuitry is controlled based on a status indication from the hardware definition of the block in the first set.

14 Claims, 5 Drawing Sheets

```
long f(long w, long x, long y, long z, long count)
{
        long u, v, s, t, q, i;
        u = x+y;
        v = w+z;
        s = v+2+x;
        t = u+y;
        q = t+s;
        for (i = 0; i < count; i++)   {
            q = q + i;
        }
        return q;
};
```

METHODS FOR IDENTIFYING GATING OPPORTUNITIES FROM A HIGH-LEVEL LANGUAGE PROGRAM AND GENERATING A HARDWARE DEFINITION

FIELD OF THE INVENTION

The present invention generally relates to identifying gating opportunities for a hardware implementation of a high-level language program.

BACKGROUND

One recent trend in circuit design has been to use high-level programming languages (HLLs) to design electronic circuits. For example, a circuit design can be specified initially as a program written in an HLL such as Fortran, C/C++, JAVA, or the like. This approach allows a developer to concentrate on an algorithmic solution to a problem rather than the specific hardware involved. A variety of different tools are available which effectively translate the HLL program into a synthesizable netlist or other software-based circuit representation. Tools for Compiling High Level Language into Massively Pipelined Systems (CHiMPS) provide means to compile programs written in languages such as C and Fortran into an intermediate language ("CHiMPS language"). The CHiMPS language specification can then be further processed to implement the design in a suitable combination of hardware (e.g., a field programmable gate array FPGA) and software.

Once the electronic circuit design is implemented in hardware, power consumption and performance (e.g., speed) are two factors that come into play, and often in a competing manner. Clock gating is one technique used to reduce power consumption. For example, tools can be used to analyze a hardware circuit to locate groups of flip-flops or latches that can be disabled under certain conditions. A control signal can then be generated based on those conditions to gate the clock signal to the identified flip-flops or latches. This can greatly reduce or eliminate the dynamic power consumption (switching power) of that portion of the circuit. In a typical design, clock gating can reduce total power by up to 30%.

SUMMARY OF THE INVENTION

The various embodiments of the invention provide for generating a hardware definition from a program specified in a high-level language. In one embodiment, a method includes identifying a first set of blocks of instructions in the high-level language program. Each block in the first set is bounded by a respective loop designation in the high-level language. For each block in the first set, the method identifies an associated respective second set of one or more blocks of the program. Each block in the second set is outside the block in the first set. A hardware definition of the program is generated. For each block in the first set the hardware definition specifies power-reducing circuitry for one or more blocks in the associated second set. The power-reducing circuitry is controlled based on a status indication from the hardware definition of the block in the first set. The method then stores the hardware definition.

In another embodiment, an apparatus is provided for generating a hardware definition from a program specified in high-level language. The apparatus includes means for identifying a first set of blocks of instructions in the high-level language program. Each block in the first set is bounded by a respective loop designation in the high-level language. Means are provided, for each block in the first set, for identifying an associated respective second set of one or more blocks of the program. Each block in the second set is outside the block in the first set. The apparatus further includes means for generating a hardware definition of the program. For each block in the first set the hardware definition specifies power-reducing circuitry for one or more blocks in the associated second set. The power-reducing circuitry is controlled based on a status indication from the hardware definition of the block in the first set. Means are provided for storing the hardware definition.

An article of manufacture is provided in another embodiment. The article of manufacture comprises a processor-readable storage medium configured with processor-executable instructions for generating a hardware definition from a program specified in high-level language. The instructions, when executed, cause the processor to perform the operations including identifying a first set of blocks of instructions in the high-level language program. Each block in the first set is bounded by a respective loop designation in the high-level language. For each block in the first set, one or more operations identify an associated respective second set of one or more blocks of the program. Each block in the second set is outside the block in the first set. The operations include generating a hardware definition of the program. For each block in the first set the hardware definition specifies power-reducing circuitry for one or more blocks in the associated second set. The power-reducing circuitry is controlled based on a status indication from the hardware definition of the block in the first set. The operations further store the hardware definition.

It will be appreciated that various other embodiments are set forth in the Detailed Description and Claims that follow.

BRIEF DESCRIPTION OF THE DRAWINGS

Various aspects and advantages of the invention will become apparent upon review of the following detailed description and upon reference to the drawings, in which:

FIG. 2 is an example block of code in a high-level language used to illustrate aspects of certain embodiments of the invention;

DETAILED DESCRIPTION

Figure 1:
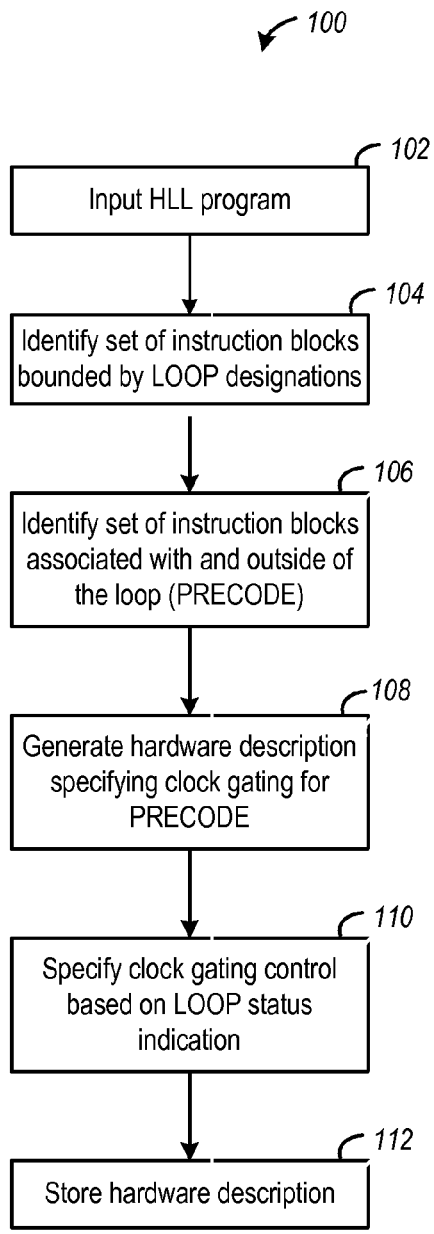
FIG. 1 is a flowchart describing steps performed in accordance with an embodiment of the invention.

The various embodiments of the invention provide processor-implemented methods for generating a hardware definition from a program specified in a high-level language (HLL). Such methods may be used to identify clock gating opportunities prior to implementation of the hardware definition. In accordance with certain embodiments, the methods of the present invention include identifying iteratively executable blocks of instructions in the HLL program by looking for the bounding loop designations. For each iteratively executable block, a set of one or more blocks of the program executed outside the iteratively executable block is identified and associated with the iteratively executable block. A hardware definition of the program is then generated to include clock gating specified for the blocks outside the loops, with the clock gating controlled by a status indication for the associated loop. The hardware definition may then be stored and used for synthesizing and mapping onto programmable logic device circuitry.

In certain embodiments, circuitry other than clock gating may be specified for reduced power consumption of the blocks outside the loops, in recognition of the likelihood that the blocks outside the loop will remain idle for some time while the loop is being execution. Such other circuitry includes power gating, data gating, and clock enable toggling. It will be recognized that such circuitry or any other suitable circuitry resulting in reduced power usage of instruction blocks idling during loop execution may be selected and effectively used depending on particular applications. For ease of discussion, and without loss of generality, exemplary clock gating embodiments may be used to illustrate various aspects of the present invention.

The clock gating control for the instruction blocks outside a loop may be based on a status indication of the respective loop. For example, the clock gating may be controlled based on when the loop commences and completes the loop processing. As another example, the clock gating may be controlled based on an indication that a specified amount of time has elapsed since the loop was initiated, the specified amount of time being selected to reflected an expected amount of idle time for the instruction blocks outside the loop. In certain embodiments, the instruction blocks outside the loop may be clocked for a period of time during which the loop is executing, and then gated until an indication of loop completion is received, where the period of time is based on an expected latency for the instruction blocks outside the loop. The expected latency is an estimate of the period of time it would take for those blocks outside the loop to complete their operation. Other clock gating controls may also be used to gate the instruction blocks outside the loop for at least some period of time during which the loop is executing, thereby resulting in a net power reduction.

The various embodiments of the present invention provide methods for generating a hardware definition in such a way as to identify power saving opportunities at the HLL stage, and to build such power savings into the hardware definition via clock gating or other suitable circuitry. Power saving opportunities are efficiently identified during the HLL stage by looking for iteratively executed blocks of code. For some designs, it can be expected that the portions of the circuit that implement blocks of instructions outside an iteratively executed block will remain idle while the portion of the circuit that implements the iteratively executed block is performing its functions. The idle portions continue to consume power (e.g., by continuing to be clocked) even though the real work is being performed by the circuitry that implements the iteratively executed block. As such, in accordance with certain embodiments, portions of the circuit that implement the instruction blocks outside the loop may be gated while the portion of the circuit that implements the iteratively executed block is performing its functions, resulting in reduced power consumption in the circuit.

In past efforts, clock gating opportunities were identified only after hardware implementation, by locating portions of circuitry that continue to consume power while remaining idle, and by determining the conditions under which such circuitry portions remain idle. Identification of gating opportunities at the hardware implementation level is less effective, because hardware designs are represented by low-level (gate-level) logic representation while HLL designs are represented by high-level constructs (instructions, functions). Opportunities for gating large portions of the design are more easily identified when working with a high-level representation than with a low-level logic representation. Working with a low level logic representation is inefficient or may be infeasible relative to working with a high-level representation. Advantages may include an estimated order(s)-of-magnitude improvement in design tool speed of operation, in combination with a significant percentage improvement in power savings of the implemented circuit.

In the embodiments of the present invention, loop designations in the HLL code may be readily identified so that gating may be specified for the remaining portions of code. In accordance with certain embodiments, the present invention specifies clock gating of designs described in HLL (such as C or Fortran), and that are compiled using CHiMPS tools, for example. In certain embodiments, CHiMPS compilation may be used to generate a dataflow graph (DFG) from a HLL program. The DFG may further be used to generate an implementation, which is based in hardware or a combination of hardware and software, of the functions specified in the HLL program. Nodes in the DFG are instantiated with CHiMPS hardware instructions, and arcs in the DFG are instantiated with first-in first-out buffers (FIFOs). Further details of the CHiMPS tool flow may be found in U.S. Pat. No. 7,315,991, to Bennett, which is incorporated herein by reference.

Before describing the figures, a brief summary of the CHiMPS tool flow is provided in the following paragraphs. A CHiMPS compiler compiles a program in a standard or proprietary HLL such as C, C++, Fortran and many others known to those skilled in the art, into a CHiMPS language program. The CHiMPS language, as do conventional assembly languages, utilizes op-code mnemonics and operands. Within the CHiMPS language, instructions and pseudo-instructions are used. Generally, instructions may be used to generate a hardware specification, while pseudo-instructions provide information to the assembler. Instructions correspond to predefined hardware modules and operands of instructions correspond to FIFOs or registers. In other words, the instructions of the CHiMPS language representation typically are converted into instantiations of predefined hardware modules. The predefined hardware modules act on the operands, which are converted into FIFOs linking the hardware modules. The hardware implementation of a CHiMPS instruction generally waits for available data in the input FIFO(s), then performs the operation and sends results to output FIFO(s), which provides input to the next instruction(s), thereby creating a pipeline.

In transforming a high-level language program to an implementation, a subset of the program may be selected for implementation in programmable logic, for example of an FPGA. The subset of instructions will generally be one or more groups of instructions. For example, a group of instructions may include those generated for loop structures such as "for" or "while" loops of source program code. The selection depends on the desired performance and the available hardware resources. A greater quantity of available hardware resources implies that a greater portion of the software may be implemented in hardware. Fewer hardware resources means implementing a lesser portion of the software in hardware. Parts of the design that are executed more frequently according to the profile data may be selected for implementing in hardware over parts of the design that are executed less frequently.

FIG. 1 is a flow chart 100 illustrating a method of generating a hardware definition that includes identifying and specifying clock gating opportunities from an HLL program in accordance with the inventive arrangements disclosed herein. In step 102, an HLL program is input. Within the HLL program, loop designations are used to identify each block of instructions in which the instructions within the block are iteratively executable, as in step 104. The set of instructions that forms a loop is referred to as a "LOOP" in this description. In step 106, the set of instruction blocks that are executed outside of the LOOP are identified and associated with the LOOP. The set of instruction blocks outside of the LOOP are referred to in this document as "PRECODE." Once the LOOPs and their associated PRECODE have been identified, the hardware definition can be generated as in step 108, which includes specifying clock gating for the PRECODE. In step 110, clock gating control is specified for the hardware definition of PRECODE based on a LOOP status indication from the hardware definition of the LOOP. For example, clock gating control can be based on indications of beginning and ending of LOOP operations. As another example, clock gating control can be based on a delay from when operations of the LOOP have started in order to allow sufficient time for completion of selected operations of the PRECODE. The particular form of the generated hardware definition depends on implementation requirements. For example, for some implementations a hardware description language (HDL) such as VHDL may be a suitable form for the hardware definition. Another implementation may call for generating a configuration bitstream for a PLD directly from the intermediate language. Still other implementations may call for the hardware definition to be some other known form of intermediate representation of the circuit design. In step 112, the generated hardware definition is stored.

FIG. 2 shows an example of a code segment 200 written in an HLL such as C/C++. This code includes a LOOP 210 along with instructions outside of the LOOP. In the example code segment 200, the PRECODE includes instructions 208, which are executed first, followed by the execution of LOOP 210. Because the circuit is pipelined, while the circuit for LOOP is running, the circuit for PRECODE can compute a new set of data.

The opportunity for clock gating arises when LOOP latency is longer than that of PRECODE latency, which is a common scenario for loops that iterate a relatively large number of times. In such a case, PRECODE waits for LOOP to complete before continuing with new data. During this time, the logic and FIFOs that implement the PRECODE would continue to consume power even though they are not performing useful work. In accordance with certain embodiments, the clock signal to the PRECODE circuitry is gated, for example to reduce power consumed by the PRECODE circuitry until the operations of the LOOP are complete. As such, the initiation and completion of the operations of the LOOP may be used as the control signal for clock gating of PRECODE circuitry.

Figure 3A:
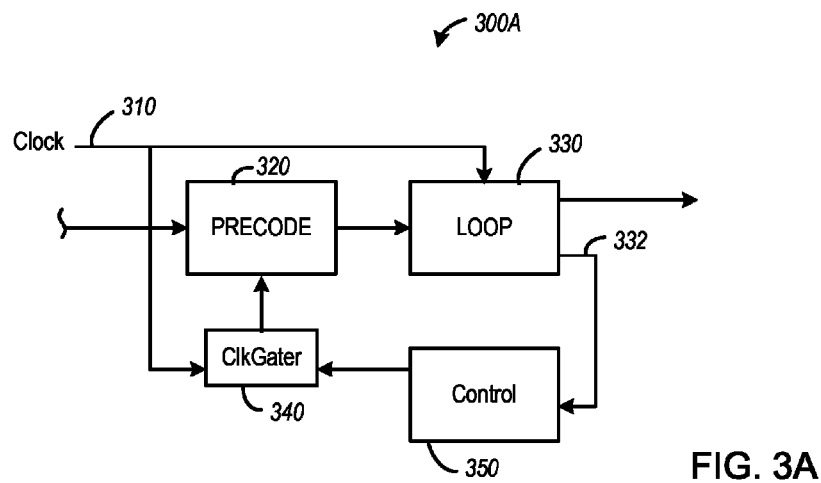
FIGS. 3A and 3B schematically show examples of clock gating specified in accordance with embodiments of the invention.
Figure 3B:
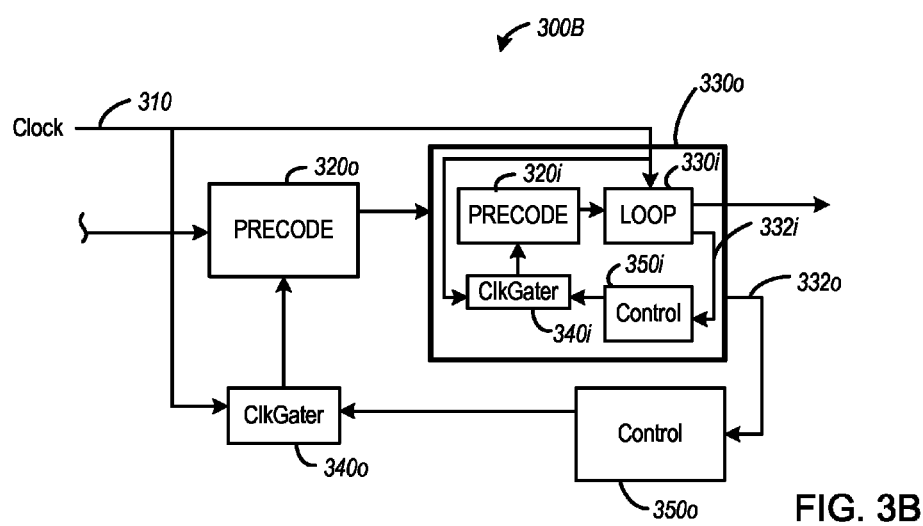

Before describing the details of the process (FIG. 4) for translating the example HLL program code segment 200 into gated hardware and the example partial data flow graph (FIG. 5) for the intermediate CHiMPS language specification, FIGS. 3A and 3B are described to illustrate in functional block form the hardware definition of LOOP, PRECODE, clock gating, and control circuitry.

FIG. 3A shows a functional block diagram 300A of hardware with clock gating that may be generated from the HLL code in FIG. 2. Clock signal 310 is used to clock the LOOP circuitry 330 and the PRECODE circuitry 320. The clock input for the PRECODE circuitry 320 is gated by a clock gater 340, while the clock input to the LOOP circuitry 330 is not gated. The clock gater 340 is controlled by a controller 350, which gates the PRECODE circuitry 320 depending on the status of the LOOP circuitry 330. In one case, the controller 350 gates PRECODE circuitry 320 when LOOP circuitry 330 is operating on some data. Such gating eliminates any overlap between PRECODE circuitry execution and LOOP circuitry execution, thereby saving power, but also potentially reducing performance benefits of pipelining.

In another embodiment, the PRECODE circuitry 320 is gated at some time after the LOOP circuitry 330 has begun operating, allowing the PRECODE circuitry sufficient time to finish any useful computation. In this way, parallel execution of the LOOP circuitry and the PRECODE circuitry occurs, maintaining pipelining in the system to mitigate any negative impacts on performance while still achieving power savings. The control logic to perform the clock gating resides in controller 350, and can be generated based on the known latency of each block. Any delay of the clock gating to the PRECODE may be synthesized into the design based on estimated latency of PRECODE.

Alternatively or in addition to clock gating, other methods can be used to reduce power in idle blocks such as the PRECODE circuitry 320. For example, power gating can be used to reduce static power in addition to dynamic power. Another example is to disable the flip flops in the PRECODE circuitry by deasserting the clock enable pin. Another example is to shield the inputs of PRECODE with data multiplexers to prevent spurious switching in PRECODE when it is idle.

FIG. 3B shows a functional block diagram 300B of hardware with clock gating to LOOP circuitry 330$i$ and LOOP circuitry 330$o$ that may be generated from a block of HLL code (not shown) that includes an inner LOOP that is nested within an outer LOOP. In this example, the clock signal 310 is used to clock the inner LOOP circuitry 330$i$ and the outer LOOP circuitry 330$o$. The clock signal to the inner PRECODE circuitry 320$i$ is shown to be gated by inner clock gater 340$i$, which is controlled by inner controller 350$i$ based on a status indication from inner LOOP 330$i$. The clock signal to the outer PRECODE circuitry 320$o$ is shown to be gated by outer clock gater 340$o$, which is controlled by outer controller 350$o$ based on a status indication from outer LOOP 330$o$. While FIG. 3B shows gating for both the inner and outer PRECODE circuitry, this need not be the case. In general, at least the outer PRECODE circuitry of nested loops is gated due to the expected longer idle time for the outer PRECODE circuitry. However, in circumstances where operations of the outer LOOP circuitry 330$o$ is expected to iterate a relatively few times whereas the inner LOOP is expected to iterate many times, gating of the inner PRECODE circuitry 320$i$ may also provide substantial power savings. It will be appreciated that clock gating circuitry for any arbitrary arrangement of loops, including multiple nested loops, can be generalized from FIGS. 3A and 3B.

Figure 4:
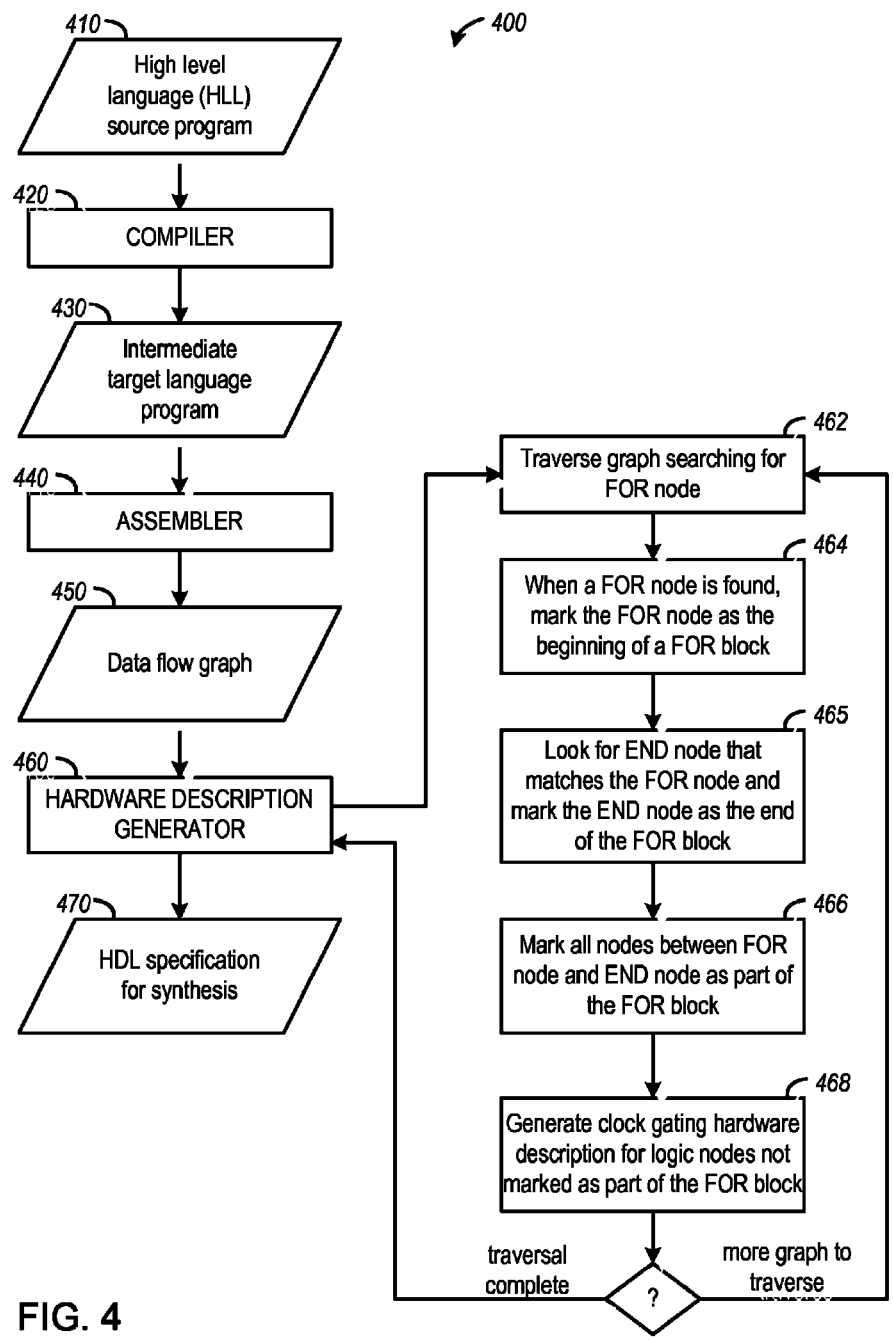
FIG. 4 is a flowchart describing steps performed in accordance with an embodiment of the invention.

FIG. 4 is a flow chart 400 illustrating a method of generating a circuit design or hardware configuration from an HLL program in accordance with the inventive arrangements disclosed herein. The method includes starting with a program specified in an HLL, as indicated in step 410. The HLL program, generally, is an algorithmic representation of a circuit design, for example for a PLD such as an FPGA, that is to be generated from the HLL program.

In step 420, the HLL program can be provided to a compiler where the HLL program can be parsed and the various constructs of the HLL program can be identified. The compiler can include several different components that facilitate the translation of HLL program to the intermediate language program (as shown in step 430). The compiler can include an HLL parser, an intermediate language generator, and an assembler. The HLL parser can be implemented as any of a variety of commercially available parsers or as a parser offered under, or from, the GNU Project so long as the parser is configured to process the particular HLL. The HLL parser receives the HLL program, which includes sequential source program instructions, and resolves each instruction into its component parts to produce parsed HLL. The HLL parser further can determine whether the received HLL program conforms to a defined standard or syntax.

In step 430, the parsed HLL program is translated into an intermediate language program such as CHiMPS or another language having substantially similar functionality so that the various constructs of the HLL program can be identified and mapped to instructions having associated hardware definitions. The intermediate language representation in step 430 then can be provided to the assembler 440. The assembler 440 processes the intermediate language representation and translates it into a data flow graph as in step 450. The assembler 440 can be implemented as a single pass assembler. Still, a preprocessor can be included which can resolve any include files and define instructions.

The data flow graph generated in step 450 specifies FIFO's and logic blocks. The data flow graph can be provided directly to the hardware definition generator 460 for identification of clock gating opportunities. As part of the generation of the hardware definition, the data flow graph is traversed in search of loop designations such as FOR nodes, as shown in step 462. Upon finding the beginning of a loop, the FOR node is marked, as in step 464, and an END node is identified that designates the end of the loop, as in step 465. All the nodes from the FOR node to the END node, inclusive, are marked as the iteratively executed block of code, as in step 466. A hardware definition for clock gating can then be generated for the remaining unmarked blocks of code which are associated with the marked loop, as in step 468. If there is more of the graph to traverse in search of additional FOR nodes, the process returns to step 462. Otherwise, the search for FOR nodes is complete, and the results from the hardware definition generator 460, including clock gating specification from steps 462-468, are stored, and may be provided as HDL specification for synthesis, as in step 470.

Hardware definitions developed and stored in accordance with embodiments of the present invention can be translated into a netlist that specifies the logic structures and signals of the design. The netlist can be compiled into a bitstream and loaded into a PLD. Accordingly, hardware components within the PLD can be instantiated based upon constructs and/or instructions of the assembly language program.

Figure 5:
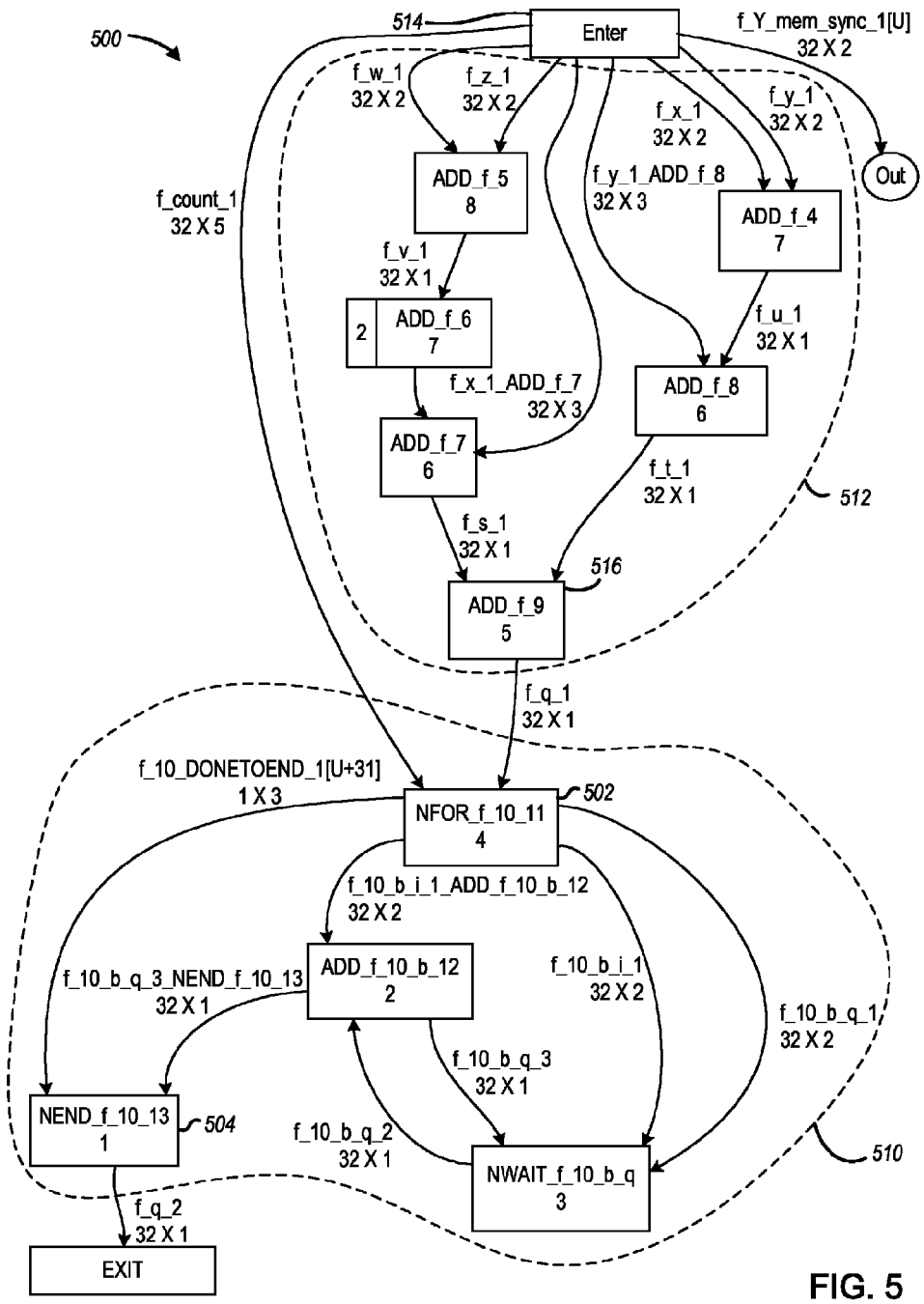
FIG. 5 is an example of a data flow graph generated for the block of code illustrated in FIG. 2.

FIG. 5 illustrates an example of a DFG 500 for the code segment 200 shown in FIG. 2. The nodes and arc correspond to the CHiMPS intermediate language program generated from the input HLL code segment 200.

In the DFG shown in FIG. 5, all the nodes and arcs between the node 502 (NFOR instruction) and node 504 (NEND instruction) are within the block of instructions for loop 510, which corresponds to LOOP 210 of FIG. 2. The portion 512 of the graph including nodes and arcs between node 514 (Enter) and node 516 (ADD) correspond to the PRECODE instructions 212 of FIG. 2 and the PRECODE circuitry 320 of FIG. 3A.

In accordance with various embodiments of the invention, the DFG, e.g., DFG 500, is used to identify LOOPs and PRECODE for generating the hardware definition. The process generally entails traversing the DFG looking for loop-type nodes such as the NFOR node 502. When such a node is encountered, it is marked or tagged and the process continues the traversal in search of the end node, e.g., NEND node 504, corresponding to the loop-type node. All nodes between the loop-type node and the end node are marked or tagged as part of the LOOP code. All nodes preceding the loop-type node in the DFG remain unmarked and are thereby considered PRECODE.

During the hardware circuit generation phase (e.g., FIG. 4, step 468), the code generates clock gating logic for nodes that are unmarked. The control signal (FIG. 2, 332) from the LOOP circuitry 330 is used for clock gating purposes and is based on the values of i and count as implemented in the LOOP circuitry.

Those skilled in the art will appreciate that various alternative computing arrangements, including one or more processors and a memory arrangement configured with program code, would be suitable for hosting the processes and storing the data structures of the different embodiments of the present invention. In addition, the processes may be provided via a variety of computer-readable storage media or delivery channels such as magnetic or optical disks or tapes, electronic storage devices, or as application services over a network. In other embodiments, a processor is recognized as any electronic circuit, for example, ASICs (application specific integrated circuits) and FPGAs, configured to perform the operations associated with the various embodiments described herein.

The present invention is thought to be applicable to a variety of systems for creating combined hardware and software systems. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A processor-implemented method for generating a hardware definition from a program specified in a high-level language, the method comprising:

identifying a first set of blocks of instructions in the high-level language program, each block in the first set bounded by a respective loop designation in the high-level language;

for each block in the first set, identifying an associated respective second set of one or more blocks of the program, each block in the second set being outside the block in the first set;

wherein identifying the first set of blocks and identifying the associated respective second sets of one or more blocks include:

generating a data flow graph of the program;

traversing the data flow graph in search of respective start and end nodes identifying loops; and for each identified loop, marking the respective start and end nodes and each node therebetween as representative of a block in the first set, and leaving each node outside of the loop unmarked and representative of the one or more blocks of the associated second set;

generating a hardware definition of the program, wherein for each block in the first set the hardware definition specifies power-reducing circuitry for one or more blocks in the associated second set, the power-reducing circuitry controlled based on a status indication from the hardware definition of the block in the first set;

wherein generating the hardware definition includes specifying clock gating for hardware definition of the one or more blocks in the associated second set represented by the unmarked nodes;

wherein the hardware definition of the status indication from at least one block in the first set specifies maintaining power for circuitry that implements the one or more blocks in the associated second set for a period of time while circuitry that implements the at least one block is operating, and specifies reducing power for circuitry that implements the one or more blocks in the associated second set after expiration of the period of time and until the circuitry that implements the at least one block completes operation; and storing the hardware definition.

2. The method of claim 1, wherein the hardware definition of the power-reducing circuitry includes clock gating for the hardware definition of one or more blocks in the associated second set.

3. The method of claim 1, wherein the hardware definition of the power-reducing circuitry includes one or more of power gating, clock enable, or data gating for the hardware definition of one or more blocks in the associated second set.

4. The method of claim 1, wherein the status indication from the hardware definition of the block in the first set represents a beginning of and termination of loop processing by circuitry that implements the block in the first set.

5. The method of claim 1, wherein the selected period of time is equal to an expected latency of circuitry that implements one or more blocks in the associated second set to complete operation.

6. The method of claim 1, wherein identifying the first set of blocks includes searching for compiler directives that specify loops in the high-level language program.

7. The method of claim 1, wherein the hardware definition implements a circuit in programmable logic.

8. The method of claim 7, wherein the programmable logic includes a Field Programmable Gate Array (FPGA).

9. A system for generating a hardware definition from a program specified in high-level language, comprising:

a processor;

a memory arrangement coupled to the processor, wherein the memory arrangement is configured with instructions that when executed by the processor cause the processor to perform operations including:

identifying a first set of blocks of instructions in the high-level language program, each block in the first set bounded by a respective loop designation in the high-level language;

for each block in the first set, for identifying an associated respective second set of one or more blocks of the program, each block in the second set being outside the block in the first set;

wherein identifying the first set of blocks and identifying the associated respective second sets of one or more blocks include:

generating a data flow graph of the program;

traversing the data flow graph in search of respective start and end nodes identifying loops; and for each identified loop, marking the respective start and end nodes and each node therebetween as representative of a block in the first set, and leaving each node outside of the loop unmarked and representative of the one or more blocks of the associated second set;

generating a hardware definition of the program, wherein for each block in the first set the hardware definition specifies power-reducing circuitry for one or more blocks in the associated second set, the power-reducing circuitry controlled based on a status indication from the hardware definition of the block in the first set;

wherein generating the hardware definition includes specifying clock gating for hardware definition of the one or more blocks in the associated second set represented by the unmarked nodes;

wherein the hardware definition of the status indication from at least one block in the first set specifies maintaining power for circuitry that implements the one or more blocks in the associated second set for a period of time while circuitry that implements the at least one block is operating, and specifies reducing power for circuitry that implements the one or more blocks in the associated second set after expiration of the period of time and until the circuitry that implements the at least one block completes operation; and storing the hardware definition.

10. An article of manufacture, comprising:

a non-transitory processor-readable storage medium configured with processor-executable instructions for generating a hardware definition from a program specified in high-level language by performing the operations including:

identifying a first set of blocks of instructions in the high-level language program, each block in the first set bounded by a respective loop designation in the high-level language;

for each block in the first set, identifying an associated respective second set of one or more blocks of the program, each block in the second set being outside the block in the first set;

wherein identifying the first set of blocks and identifying the associated respective second sets of one or more blocks include:

generating a data flow graph of the program;

traversing the data flow graph in search of respective start and end nodes identifying loops; and for each identified loop marking the respective start and end nodes and each node therebetween as representative of a block in the first set, and leaving each node outside of the loop unmarked and representative of the one or more blocks of the associated second set;

generating a hardware definition of the program, wherein for each block in the first set the hardware definition specifies power-reducing circuitry for one or more blocks in the associated second set, the power-reducing circuitry controlled based on a status indication from the hardware definition of the block in the first set;

wherein generating the hardware definition includes specifying clock gating for hardware definition of the one or more blocks in the associated second set represented by the unmarked nodes;

wherein the hardware definition of the status indication from at least one block in the first set specifies maintaining power for circuitry that implements the one or more blocks in the associated second set for a period of time while circuitry that implements the at least one block is operating, and specifies reducing power for circuitry that implements the one or more blocks in the associated second set after expiration of the period of time and until the circuitry that implements the at least one block completes operation; and storing the hardware definition.

11. The article of manufacture of claim 10, wherein the hardware definition of the power-reducing circuitry includes clock gating for the hardware definition of one or more blocks in the associated second set.

12. The article of manufacture of claim 10, wherein the hardware definition of the power-reducing circuitry includes one or more of power gating, clock enable, or data gating for the hardware definition of one or more blocks in the associated second set.

13. The article of manufacture of claim 10, wherein the status indication from the hardware definition of at least one block in the first set represents a beginning of and termination of loop processing by circuitry that implements the at least one block in the first set.

14. The article of manufacture of claim 10, wherein the selected period of time is equal to an expected latency of circuitry that implements one or more blocks in the associated second set to complete operation.

* * * * *